Jan. 11, 1944.   J. LOUMIET ET LAVIGNE   2,338,773
AUTOMATIC BOILER FEED REGULATOR
Filed June 27, 1940   8 Sheets-Sheet 1
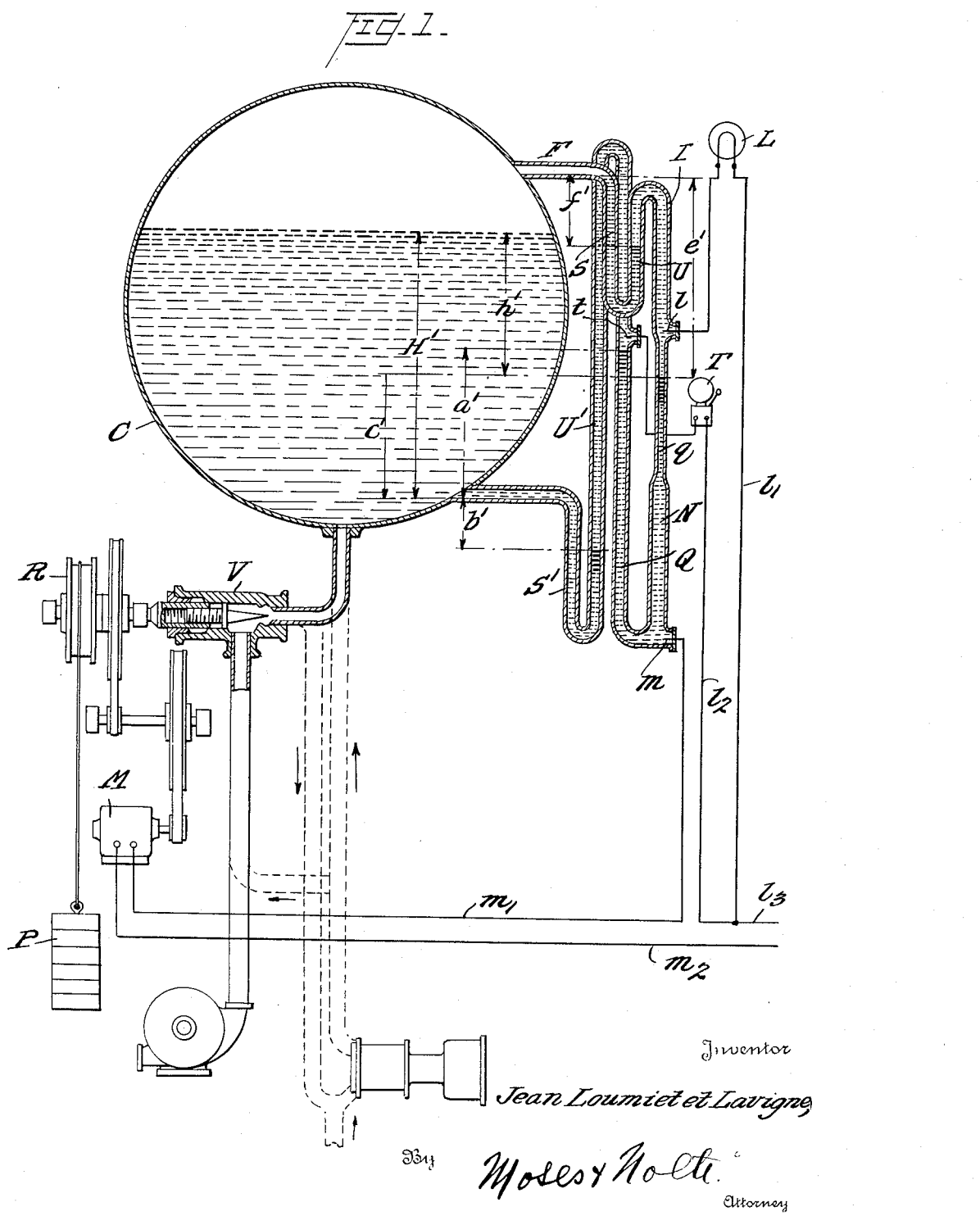

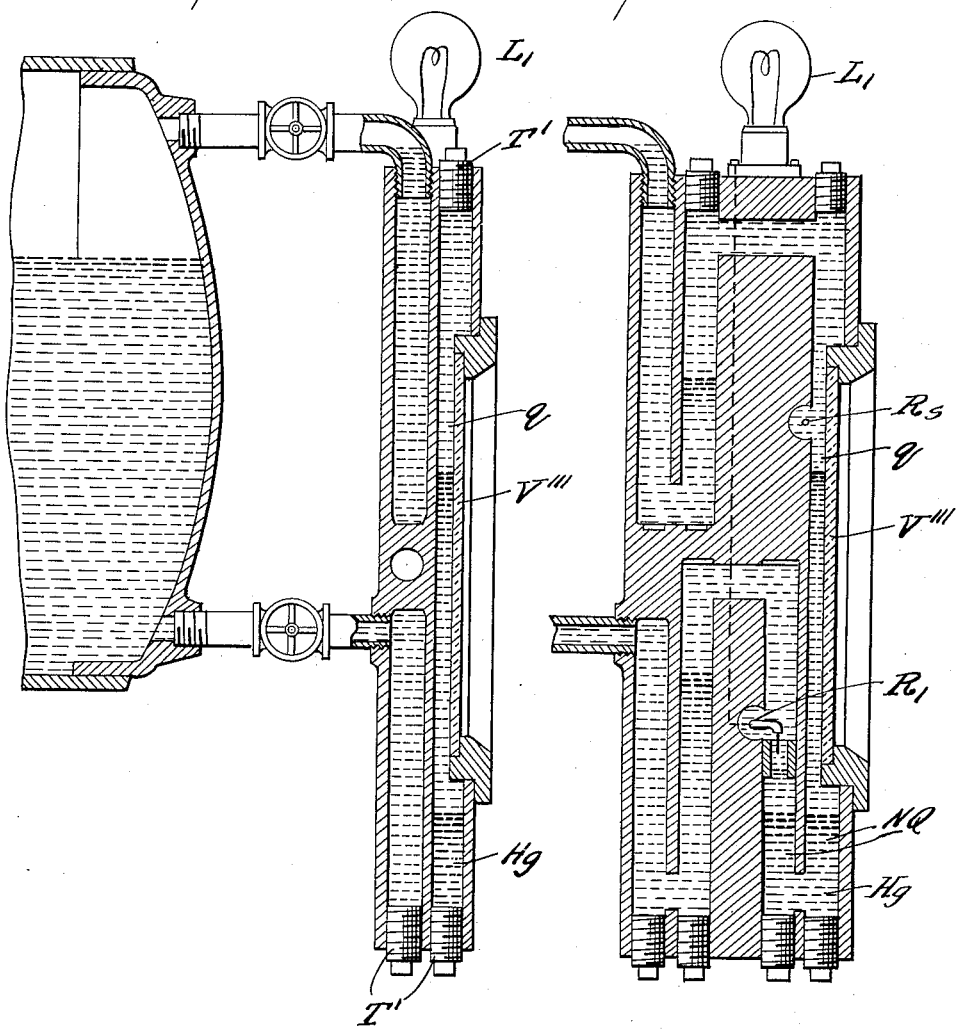

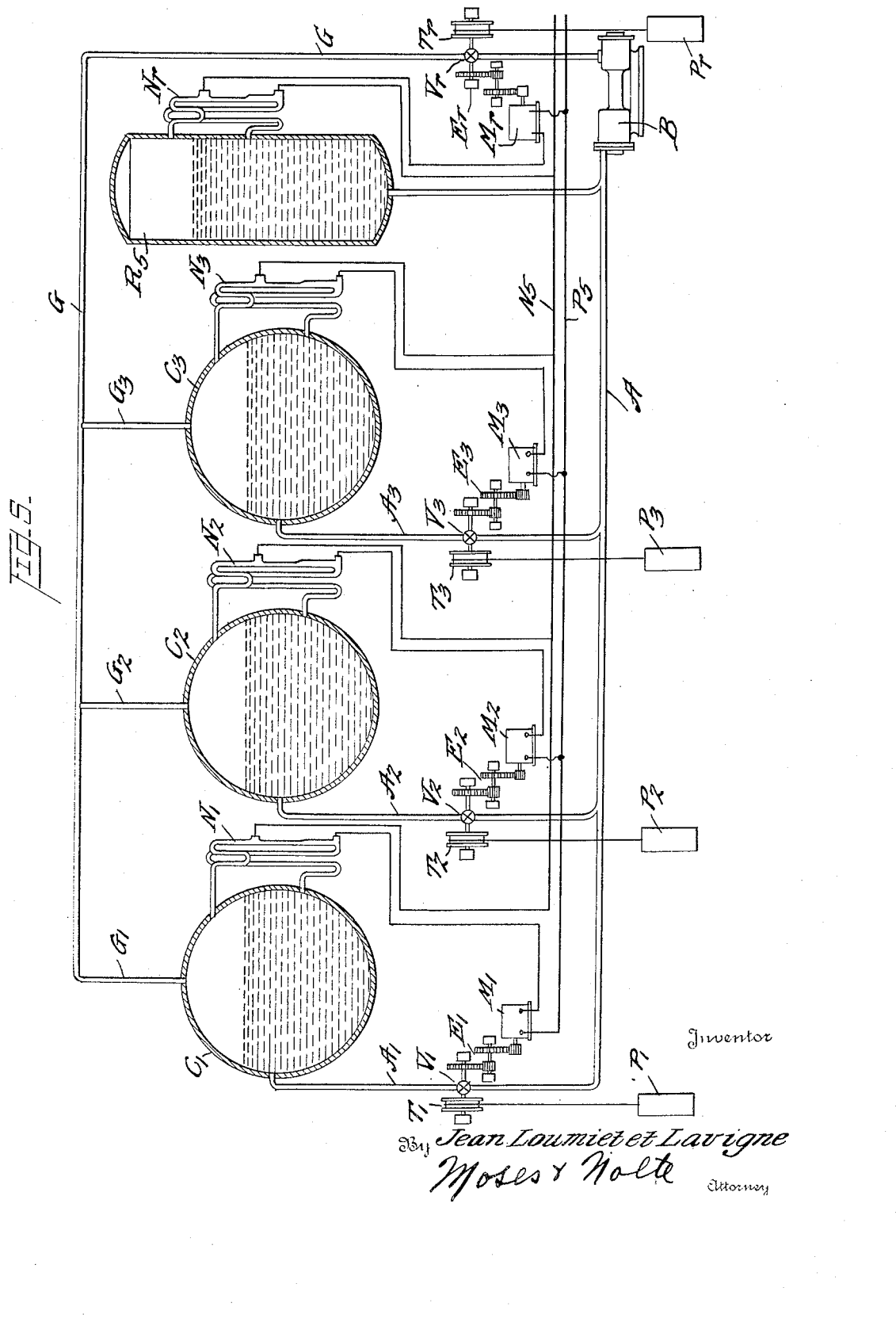

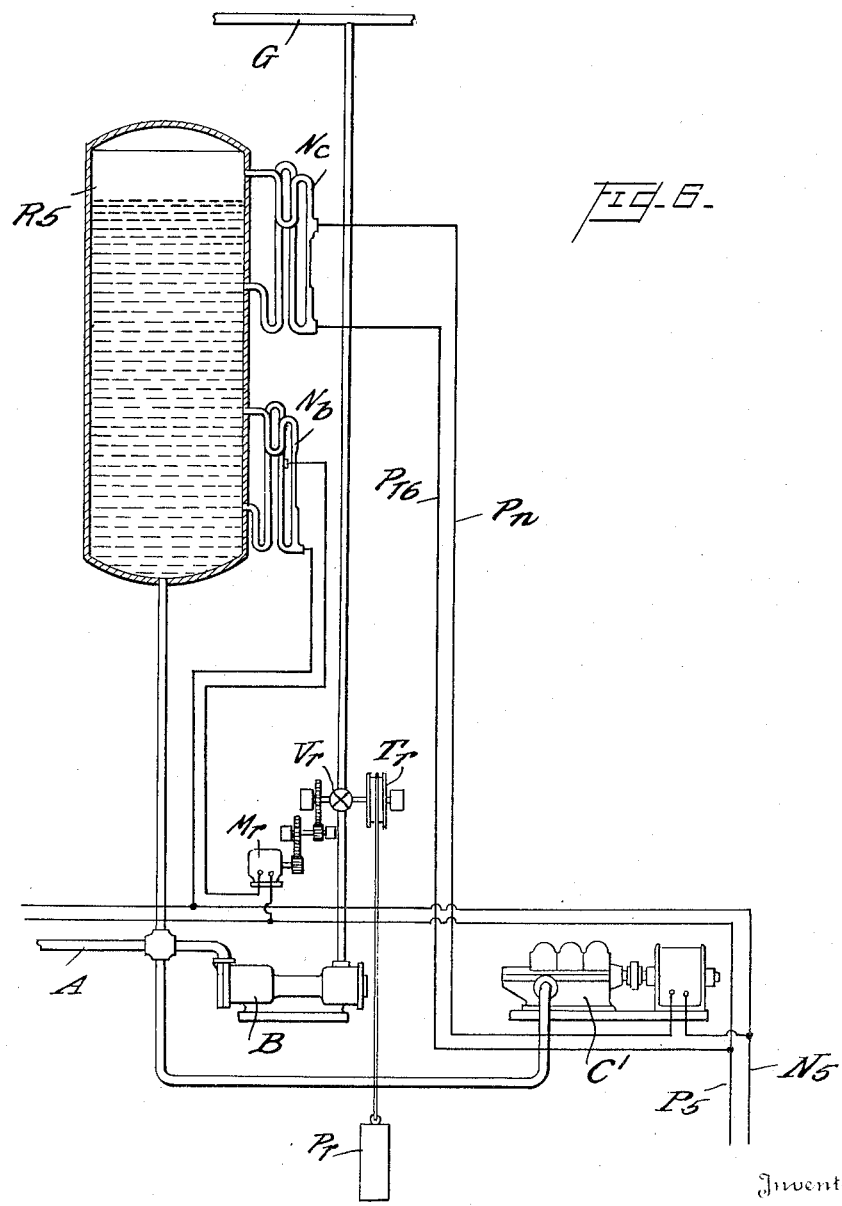

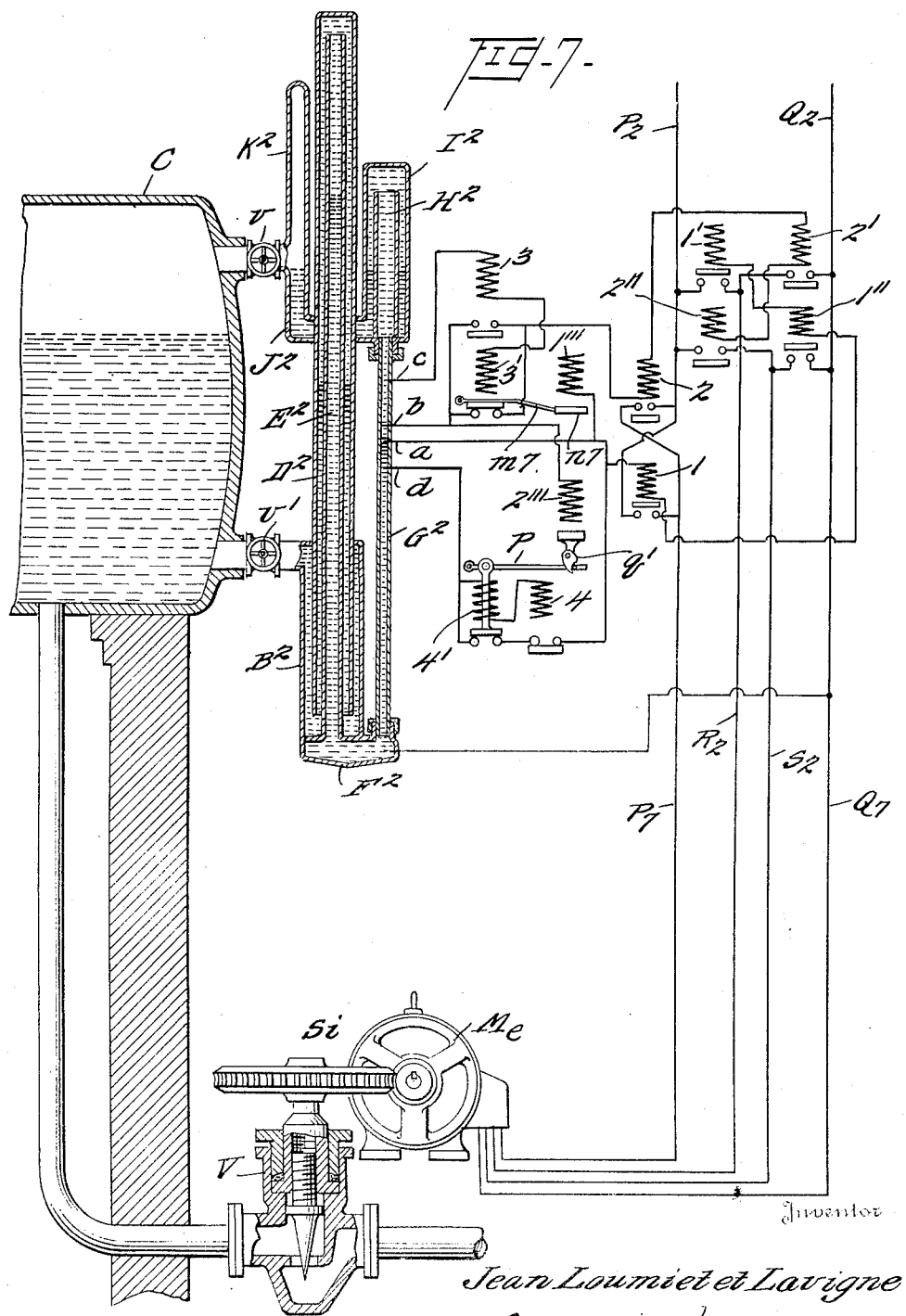

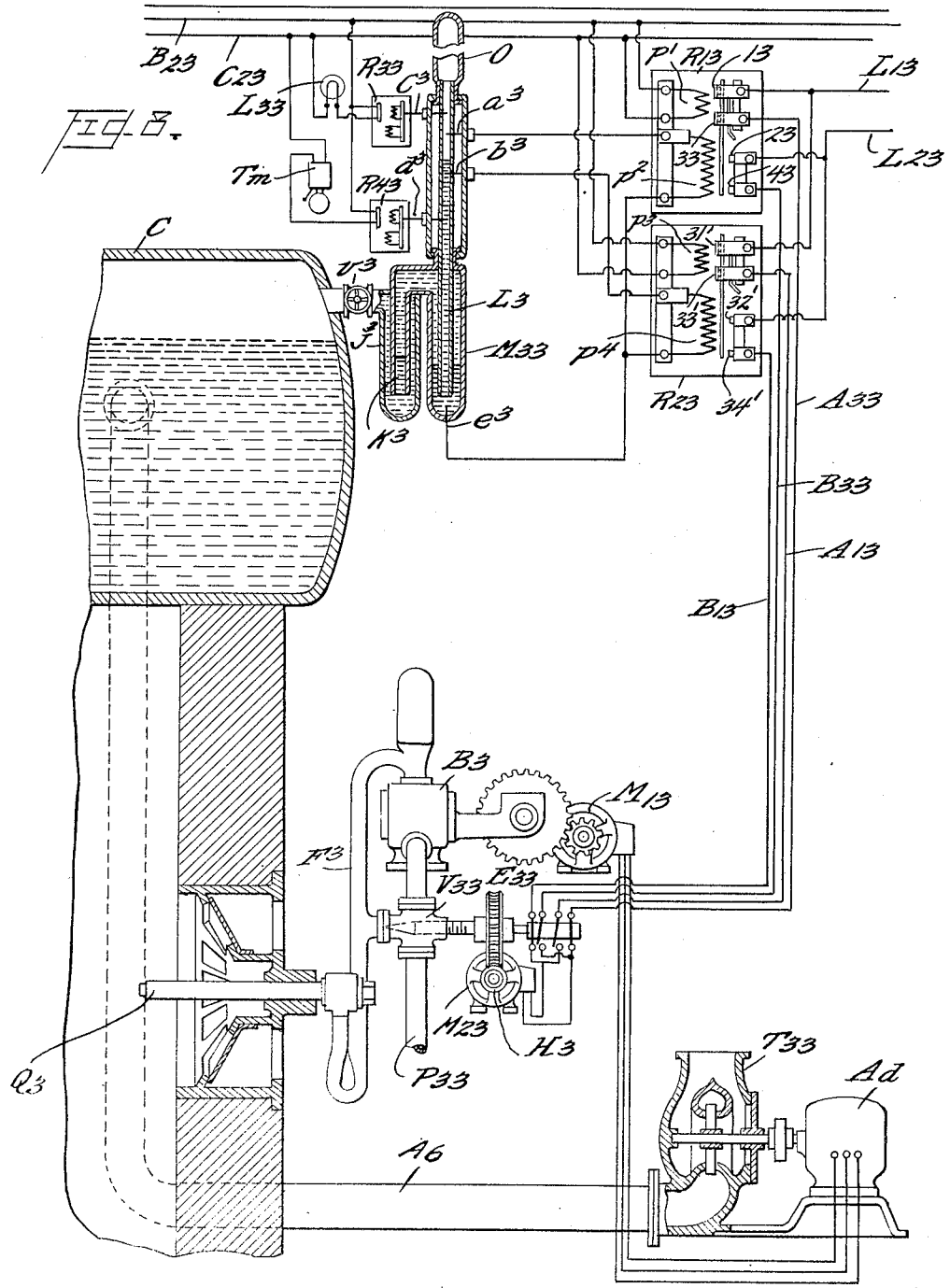

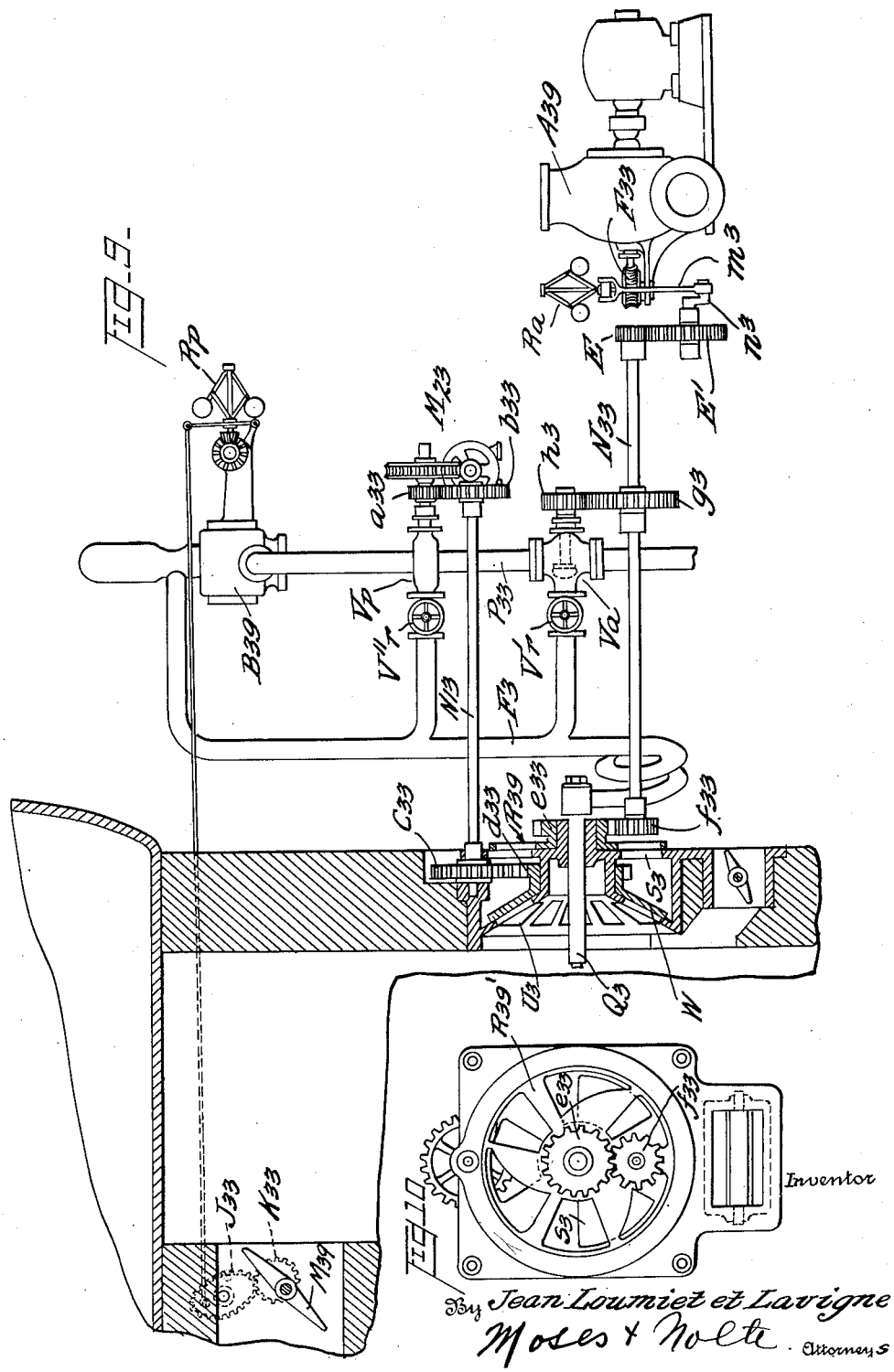

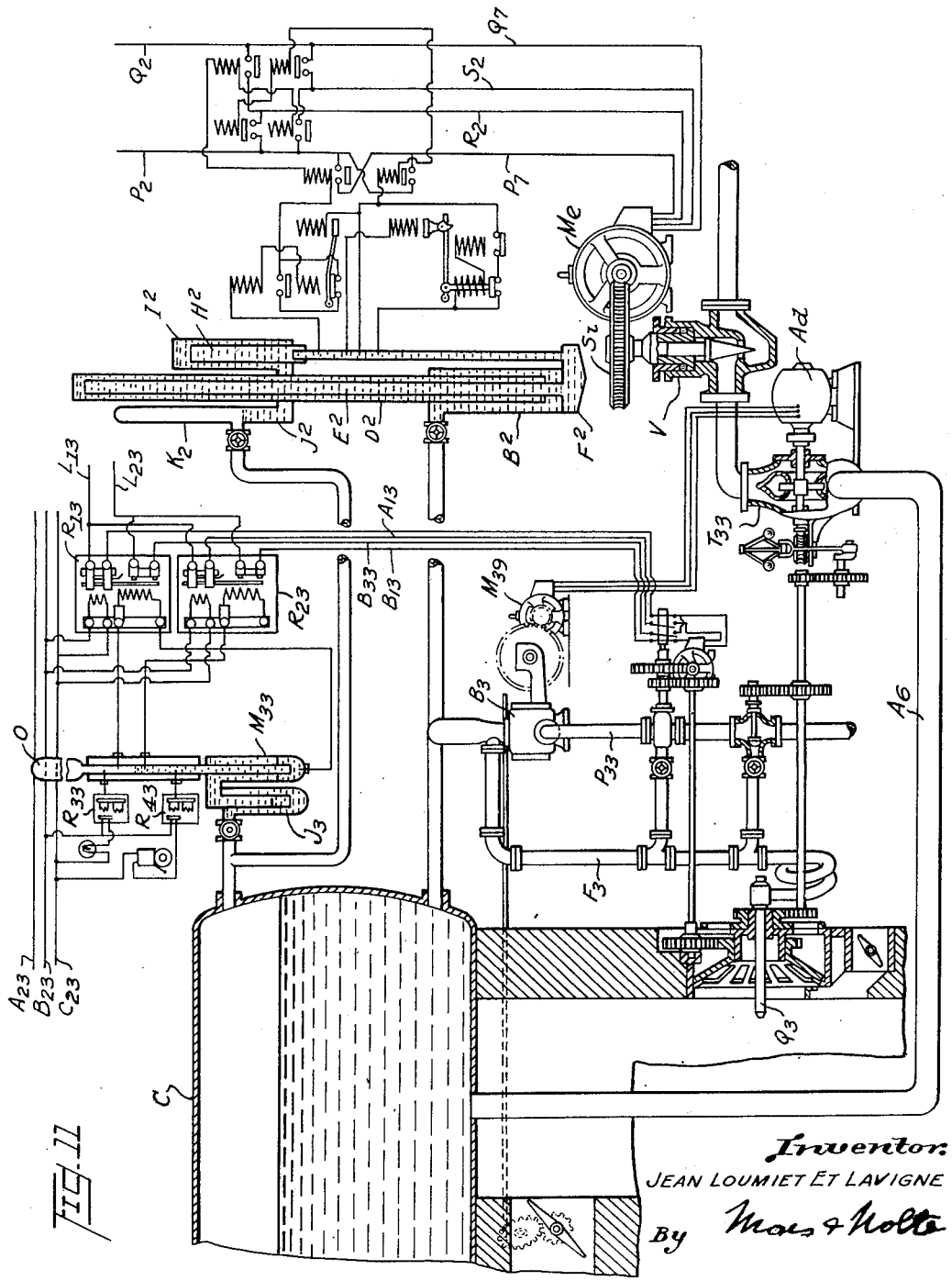

Patented Jan. 11, 1944

2,338,773

UNITED STATES PATENT OFFICE 2,338,773

AUTOMATIC BOILER FEED REGULATOR

Jean Loumiet et Lavigne, Itabo, Cuba

Application June 27, 1940, Serial No. 342,792
In Cuba June 30, 1939

24 Claims. (Cl. 122—44.8)

This invention relates to improvements in automatic regulation of steam boilers, and especially to automatic control of the water fed to the boiler and of the fuel and air fed to the boiler furnace.

The present tendency is to reduce the steam chamber of the boilers to a minimum with the purpose of facilitating the construction of high pressure boilers, of cheapening their construction, and of diminishing the danger from explosions; but since the consumption of steam in many industries varies widely, the decrease in steam volume in the boilers is intimately related to the solution of the problem of regulation of the water level in the boiler.

A purpose of this invention is to provide an improved arrangement for automatically regulating the level of the water in the steam boilers. This is in general accomplished by means including a control device employing a column of liquid that is a good conductor with variations in the water level in the boiler, and controlling the rate of water feed to the boiler by electrical means operated by one or more electrodes arranged to make and break contact with the conducting liquid as it rises and falls.

In the preferred arrangement the conducting liquid level is controlled by hydraulic transmission of the boiler steam pressure to one end of the liquid column, and of the liquid pressure near the bottom of the boiler to the other end of the column. The electrical control is advantageously obtained by providing an electric motor which gradually turns a boiler feed water valve and is actuated through electrode means, one arrangement including an electrode located to make contact with the conducting liquid when it reaches a level indicating that the boiler water is at the desired level. The conducting liquid is separated from the boiler water and the steam or condensate respectively by columns of a liquid which is a poor conductor of electricity, such as oil. The diameter of the column of conducting liquid is advantageously reduced in the zone of vertical oscillation of its upper level to amplify the range of oscillation.

A further feature of the invention is the provision of a suitable alarm arrangement operated by changes in level of the conducting liquid to indicate excessively high or low water levels in the boiler.

Various arrangements may be employed for appropriately closing and opening the boiler feed water valve. In the simplest arrangement the valve is provided with a counterweight which tends to open it, and is connected to a motor which gradually closes the valve and is energized when the conducting liquid rises to the predetermined level, the motor operating also to lift the counterweight. When, due to the decrease in the valve opening, the water in the boiler falls below the desired level, the column of conducting liquid descends below the contact electrode, the current to the motor is cut off and the motor stops. The counterweight then descends slowly, turning the valve in the opposite direction and increasing the valve opening. The rate of feed is thus increased and the water level in the boiler again rises.

The valve is thus subjected to alternating actuation, increasing or decreasing alternately the valve opening within a range including the exact opening required at any given moment by the steam consumption.

The same regulating arrangement may be applied to the steam or electric water feed pump so that the pump output corresponds accurately to the boiler feed requirements.

The electrical control system may be improved by using two electrodes arranged to contact the conducting liquid, one slightly below and the other slightly above the desired level of said liquid, at which the original electrode was located and which corresponds to the desired boiler water level. When the conducting liquid level is below the lower electrode, the motor is energized to open the feed valve. When the circuit of the lower electrode is energized it stops the motor and the feed valve rotation; while the energizing of the circuit of the upper electrode causes the motor to turn in the opposite direction and gradually closes the valve. This arrangement dispenses with the counterweight.

The described arrangements are open to serious objections because they increase or reduce the feed only on the basis of the excess or deficiency of water in the boiler. However, it is not the height of the water level in the boiler, but the direction of change of its level that shows whether a deficiency or an excess in the feed exists. The regulation operated in the described manner has the fault of increasing the deficiency existing in the water feed when the water level stands too high but is descending, and in the same way it has the fault of increasing the excess existing in the water feed when the level stands below normal but is ascending. Such imperfections in the regulation create perpetual oscillations that represent a grave fault especially when the water feed must serve as a guide for the feed of the means of combustion to the same boiler. The extent of such oscillations is double the maximum deviation attained by the water level in the boiler.

This fault is amended if the actuation of the regulation is maintained only while an error exists in the feed which produced the existing excess or deficiency in the water level in the boiler. This is obtained through the suspension of said actuation when the boiler water level is returning to normal.

For this purpose an upper auxiliary electrode is located above the upper original electrode within the oscillating limits of the indicating column, and is connected to a suitable circuit operating when the liquid falls below the level of the upper auxiliary electrode in its descent toward the original electrodes to stop the motion of the valve. From that moment the valve opening remains fixed, which means that the extent of the oscillations is reduced in conformity with the distance between the new electrode and the original upper electrode on which the valve motion would normally be suspended. A second similarly operating auxiliary electrode is correspondingly located below the lower original electrode.

In order to reduce the wide oscillations that might result from very large modifications in water feed conditions, it is desirable to locate the auxiliary electrodes at a substantial distance from the original electrodes. However, electrodes thus situated would have no effect whatever on minor oscillations that would not reach them. In consequence, it may be desirable to employ another set of supplemental electrodes, each located between an auxiliary electrode and the adjacent original electrode, the auxiliary electrodes being spaced sufficiently to produce a substantial correction in the oscillations and considerably reduce their extent, and the supplemental electrodes being arranged relatively close to the original electrodes in order to reduce all oscillations of any material magnitude. Such supplemental electrodes will have the same arrangement and operating system as the auxiliary electrodes, and, therefore, are not shown.

In controlling the water level in the boiler there is an important relationship between regulation of the feed water rate and regulation of the rate of fuel feed which controls the pressure in the boiler. Obviously, the maintenance of uniform steam pressure in the boiler is an important factor in the accurate control of the water level. The invention includes the combination of the indicated feed water control features with an arrangement similarly regulating the fuel feed and thereby controlling the steam pressure and the amount of water turned into steam. The general features of the fuel control system will be set forth appropriately hereafter in connection with the specific description of this portion of the invention.

Other objects and advantages of the invention will appear from the following description considered in connection with the accompanying drawings in which:

Fig. 1 is a schematic view of a boiler feed water regulating system including a control electrode and a counterweight;

Fig. 2 is an enlarged view of a portion of the system with the indicator casing in vertical section on line A—F of Fig. 3;

Fig. 3 is a horizontal section through the indicator casing;

Fig. 4 is an expanded vertical section through the indicator casing on line A—B—C—D—E—F of Fig. 3;

Fig. 5 is a schematic view of the system applied to a battery of boilers fed by a steam donkey engine;

Fig. 6 is a schematic view of a portion of the system shown in Fig. 5 illustrating alternative water feed from an electric pump and a steam donkey engine;

Fig. 7 is a schematic view of a feed water control arrangement provided with two sets of control electrodes;

Fig. 8 is a schematic view showing a fuel feed control arrangement;

Fig. 9 is a fragmentary schematic view of a portion of a similar arrangement showing details of a mechanical control arrangement including air supply control;

Fig. 10 is a fragmentary face view of an air inlet valve shown in Figure 9, and

Fig. 11 is a schematic view showing the regulation system simultaneously applied to the water feed and to the feed of the means of combustion, combining the arrangements shown in Figs. 7, 8 and 9.

Referring particularly to Fig. 1, the tube or passage shown as containing the column of conducting liquid which operates the regulating system is arranged with two ends portions of medium diameter and an intermediate portion of smaller diameter. Said tube, the upper part of which is indicated at I and the lower part at N, is connected at its lower end N through a suitable tube or passage with the water-filled lower part of the boiler C, and is connected at its upper part I with the upper part of said boiler which is filled with steam.

Each of the tubes connecting tube IN with the boiler comprises a horizontal tube section, a U-tube section filled with water, and an inverted U-tube filled with oil, the first leg of which is an extension of the second leg of the U-tube filled with water. The second leg of each U-tube filled with oil is an extension of an end of the tube section carrying the conducting or indicating liquid. The U-tube filled with oil located in the steam pressure transmitting line is connected with the upper part I of the indicating tube section while in the line transmitting the water pressure the oil-filled U-tube section is a continuation of the lower part N of the indicating tube section.

The tube system arranged in this manner may, therefore, be traced as follows from its connection with the upper part of the boiler to its connection with the lower part thereof.

1. A horizontal run F filled with steam and condensate.
2. A vertical run S filled with water.
3. A lower horizontal connection filled with water.
4. A vertical run U filled with water at its lower part and with oil at its upper part.
5. An upper horizontal connection filled with oil.
6. An indicating tube IN filled with oil at its upper part and with the indicating and electrical conducting fluid at its lower part.
7. A lower horizontal connection filled with indicating liquid.
8. A vertical run Q filled at its lower part and throughout its major portion with indicating liquid, and at its upper part with oil.

9. A horizontal upper connection filled with oil.

10. A vertical run U' filled at its upper part and throughout its greater portion with oil and its lower part with water.

11. A lower horizontal connection filled with water.

12. A vertical run S' filled with water.

13. A horizontal run filled with water connected to the boiler and transmitting the boiler water pressure.

The vertical run S must be kept full of condensate, for which purpose the section of the horizontal run F connected with the boiler may be reduced, its length may be increased, and if necessary it may be cooled.

It is important that the liquid system include the following features:

1. An indicating column formed by a liquid that is a good conductor of electricity, referred to herein as a conducting liquid.

2. The compensation of the excess weight of the column of condensed water through the difference in density of the liquids that transmit the pressure to the indicating column, arranged to provide an equilibrium in the hydraulic circuit which joins the upper part of the boiler through the column of indicating liquid to the lower part of the boiler.

The oil provides not simply the appropriate hydraulic balance, but also provides insulation at the ends of the conducting column. If the entire coil were filled with the same liquid, water for example, liquid movement would take place constantly from the high part of the tube S toward the high part of the tube S', because the water column in that circuit would be higher than that in the boiler, and, moreover, the water therein would be colder and, therefore, denser. In order to avoid this condition, equilibrium is established by filling preferably with dense liquids the columns or portions of the passage in which the liquid is intended to ascend in the mode of operation already indicated, and with lighter immiscible liquids the columns or passage portions in which the liquid is intended to descend. With this arrangement the rise of the heavier liquid in a column will increase the weight in that column, and decrease the weight in an adjoining in which the lighter liquid descends, thereby tending to maintain the columns in normal balanced position.

Specifically, the tube Q will be filled to a high level with liquid of relatively high density, while the upper parts of tubes U' and Q will be filled with a lighter liquid, preferably oil. The upper part of tube U will be filled with a smaller proportion of oil than tube I with which it is connected. The variations in these liquid columns will cause a given level of the indicating liquid in the tube NI to correspond with a given water level in the boiler.

The narrowness or decrease in diameter of the intermediate portion $q$ of the tube IN has two advantages. It increases the sensitiveness of the level, since the indicating column has a much greater rise and fall, and at the same time it decreases the distance through which the columns of liquids in the system must move under a given change of water level in the boiler, which guards against the mixing of the oil and water.

Brief calculations will demonstrate these effects. If $P'$ is the steam pressure in the boiler, $H'$ the height of a column of water of density $l'$, corresponding to the height of hot water in the boiler above the level of the horizontal water connection tube connecting the system of the lower part of the boiler, let $b'$ be the height of the plane of separation of the oil and water in the tube U' and $a'$ the distance of the plane of separation of the oil and indicating liquid in the tube Q. Let $c'$ be the height of the plane of separation of the conducting liquid and the oil in the portion $q$ of the indicating tube NI. All heights are taken above the level of the connection of the system to the lower part of the boiler.

Let $f'$ be the distance of the plane separating the condensate and oil in tube U from the level of the horizontal tube F; and $e'$ the distance of the plane separating the oil and indicating liquid in narrow tube portion $q$ from said level.

The calculations will be made on the basis of a density of 1.20 for the conducting liquid consisting of a solution of sodium chloride in water, a density of 0.90 for the oil and a density of 1 for the water, since a high temperature in the tubes may be avoided by employing horizontal pressure transmitting tubes of sufficient length, or cooled if necessary. Moreover, some progressive difference in temperature in the water columns S and S', if relatively fixed, would maintain a rather constant pressure condition and in consequence would not disturb the working of the apparatus.

On this basis we may calculate as follows in connection with the lower branch connecting the boiler with the apparatus.

Pressure on the plane of separation of the oil and water from the boiler in the tube U':

$$P'+H'+b'$$

Pressure on the plane of separation of the oil and the indicating liquid in the tube Q:

$$P'+H'+b'-0.90(a'+b')$$

Pressure on the plane of separation of the indicating liquid and the oil in the narrow tube part $q$:

$$P'+H'+b'-0.90(a'+b')+1.20(a'-c')$$

In connection with the upper branch connecting the steam chamber of the boiler with the apparatus, we find:

Pressure on the plane of separation of the condensed water and the oil in the tube U:

$$P'+f'$$

Pressure on the plane of separation of the oil and the conducting liquid in the narrow part $q$ of tube IN:

$$P'+f'+0.90(e'-f')$$

The equilibrium equation is, therefore, as follows:

$$P'+H'+b'-0.90(a'+b')+1.20(a'-c')= \\ P'+f'+0.90(e'-f')$$

If, in consequence, we assume a variation in the height in the water in the boiler which, referred to a liquid of density 1, is represented by $D_H$; and that in such variation there is a variation $D_a$, corresponding to $a'$; a variation $D_b$ for $b'$; a variation $D_c$ for $c'$; a variation $D_e$ for $e'$; and a variation $D_f$ for $f'$, these variations are combined in conformity with the preceding equation by the following equation:

$$D_H+D_b-0.90(D_a+D_b)+1.20(D_a-D_c)= \\ D_f+0.90(D_e-D_f)$$

Besides, inasmuch as the volume of the indicating liquid and the volume of each of the columns of the insulating oil is constant, if we assume that all the tubes or passages in the apparatus are perfectly calibrated to the same diameter, excepting the narrow part $q$ of the tube IN, which we shall assume to have a section $q$ times smaller than said diameter, it can readily be seen that:

$$D_b = D_a; \quad D_c = -qD_a; \quad D_e = qD_a; \quad D_f = -D_a$$

Substituting these values in the preceding equation gives $$D_H + D_a - 1.80D_a + 1.20(D_a + qD_a) = D_a + 0.90(qD_a + D_a)$$

$$D_H + 0.40D_a + 1.20qD_a = 0.90qD_a - 0.10D_a$$

$$D_H + 0.50D_a + 0.30qD_a = 0$$

$$D_H + D_a(0.30q + 0.50) = 0$$

$$D_a = -\frac{D_H}{0.30q + 0.50}$$

From which it follows:

$$D_c = -qD_a = \frac{D_H}{0.30 + \frac{0.50}{q}}$$

If as an example we make $q = 10$ we have:

$$D_a = \frac{-D_H}{3.50} \quad \text{and} \quad D_c = D_H \frac{10}{3.50}$$

or, that the variation in height of the plane of contact of the oil with the water in the pressure transmitting tubing is 3½ times smaller than the variation of the water in the boiler estimated as cold water; while the variation of the level between the conducting liquid and the oil in the narrow tube portion $q$, which represents the sensitiveness of the apparatus, is three times the increase in height of the water in the boiler. This indicates the desirable design characteristics and advantages of the narrow tube portion $q$.

A study of the above formulae will show that by varying the proportional diameter of the narrowed tube section $q$, that is, the coefficient $q$ in the equation, it is possible to reduce to a much greater extent the variations in the junctions between oil and water, thereby greatly reducing the motion of both fluids adjacent their planes of separation which tends to prevent mixing, as already indicated; but the increase in sensitiveness, that is, the variation in the level of the oil-indicating liquid in the narrow part $q$ of tube NI, in relation to the variation of the water level in the boiler estimated as a column of cold water, has a maximum of 3.33.

As already indicated, the regulation of the water level is accomplished through making or breaking an electric current which passes through a column of conducting liquid. The main line conductors $m_2$ and $l_3$ are connected to a suitable source of electricity. The line $m_2$ is connected to the valve motor M, the other side of which is connected through line $m_1$ to electrode $m$ in the lower tube N in contact with the conducting liquid. An electrode $l$ in the tube I, arranged for contact with the conducting liquid when the latter reaches the level of the electrode, is connected through lamp L and conductor $l_1$ to the main line $l_3$. With this arrangement, when the conducting liquid rises in the tube section $q$ into contact with electrode $l$ the motor circuit is closed, motor M is started and lamp L will burn. If, on the contrary, the column of conducting liquid descends to a level below electrode $l$, the current ceases to pass, lamp L goes out and the motor M stops.

In consequence, when the water level in the boiler rises to a point where the column of conducting liquid in tube IN is raised to the level of electrode $l$, the motor starts, and turns the feed water control valve V in a direction suitable to close the valve slowly. The valve rotation at the same time lifts a counterweight P which is suspended by a rope passing around a pulley R on the spindle of valve V. When the current ceases and motor M is no longer energized, the counterweight P is no longer counterbalanced by the motor and descends, rotating the valve spindle, the transmission and the motor itself in the opposite direction, which serves to open slowly the valve V. Both operations can be regulated by known means.

When the water level in the boiler reaches the desired height, the column of conducting liquid closes the electrical circuit, the motor starts and the water feed valve V begins to close slowly, reducing the rate of water feed. When because of such reduction the water level in the boiler descends below the desired level, the column of conducting liquid in tube IN descends below electrode $l$, the electrical current is broken, the motor is deenergized, and the counterweight P slowly opens the valve V, thereby increasing the rate of feed.

The arrangement includes an alarm bell which will ring if, due to improper operation of the apparatus, the water in the boiler should descend to a dangerous level. For this purpose an electrode $t$ is located in the tube Q at the level reached by the rear end of the conducting liquid when the boiler water level reaches the danger point. Electrode $t$ is connected to alarm bell T, and thence through conductor $l_2$ to the main line $l_3$, so that when the conducting liquid reaches the electrode $t$ the alarm bell will sound. The arrangement may be utilized in the same manner to operate an alarm siren, alarm lamp or any other signal which might appear to be more convenient.

A number of variations in the indicated arrangement may be introduced. In small installations where automatic feeding is too expensive, the control system may be dispensed with and the system reduced to the alarm arrangement which would indicate the necessity for hand pumping to feed water into the boiler. Such a system could be operated by a simple battery or the like.

The apparatus may be constructed with the tube Q having the same shape as the tube NI, that is, by narrowing tube Q throughout the range of oscillation of the indicating liquid, locating the electrode $t$ preferably in the narrowed portion of the tube or, at any rate, at the end of the narrowed portion. The inconvenience of an arrangement of this type consists in the necessary dimensions of the tube Q in order to hold a column of liquid which, because of its greater density, will balance the weight of condensed water in S. If the balancing column is formed of a very dense liquid, its dimensions may be greatly decreased and the apparatus is more convenient; but, the range of variations in level in the indicating column, which determines the sensitiveness of the apparatus, will correspondingly vary.

Figures 2, 3 and 4 illustrate a construction of this type, as well as a suitable type of casing for the various liquid columns. The various tubes indicated in Fig. 1 are formed by passages appropriately arranged in a casing, principally by means of bores from the ends of the casing closed by screw plug T, the bores being connected by short transverse passages to form the general arrangement indicated diagrammatically in Fig. 1. This is most readily observed in the expanded section shown in Fig. 4 which is a vertical developed composite section arranged to show the sequence of passages.

The casing is advantageously made of bronze, the narrowed portion $q$ of the indicating passage being covered by a sight glass $V'''$ for observation of the level of the column of conducting liquid. In this instance said column is formed at least in part from mercury $H_g$ which in the form illustrated is located in the lower part of the U-tube NQ and is supplemented at both ends by small columns of the indicating liquid. These small columns show on a much larger scale the small variations in the mercury column. The bronze casing is connected to one pole of the electrical supply system. The other pole of the system is connected through one alarm circuit to the electrode $R_s$ which corresponds to electrode $l$, and through another alarm circuit including lamp $L'$ to the electrode $R_t$, which corresponds to the electrode $t$. If the casing is constructed of non-conducting or poorly conducting material, the pole connected to the casing can be brought into contact with the mercury in the manner indicated in Fig. 1 by electrode $m$.

Fig. 5 represents an installation of a group of three boilers $C_1$, $C_2$ and $C_3$ embodying the invention. These boilers are all fed from a common steam donkey engine B through line A and branches $A_1$, $A_2$ and $A_3$, each branch including a water feed control valve $V_1$, $V_2$ and $V_3$, respectively, which is governed by a system of the type already described, including the liquid coils $N_1$, $N_2$, $N_3$, the valve control motors $M_1$, $M_2$ and $M_3$, the transmissions $E_1$, $E_2$ and $E_3$, the valve spindle pulleys $T_1$, $T_2$ and $T_3$, and the counterweights $P_1$, $P_2$ and $P_3$. The electrical system of the motors and regulators is fed from main lines $N_5$, $P_5$. An overflow or supply tank R5 is provided to receive the excess water pumped by engine B and is provided with a similar control system $N_r$, indicated by similar letters with "$r$" subscripts, which, however, controls the steam feed to the donkey engine B from the steam line G which is connected to the boilers by branches $G_1$, $G_2$ and $G_3$. The upper part of tank R5 is closed and contains a suitable volume of compressed air.

Fig. 6 is a modification of the feed control for a group of boilers such as those indicated in Fig. 5 and includes an electrically driven pump $C'$, though the steam donkey engine B is also provided in the event that pump $C'$ is not adequate or operating. The receiving tank R, which takes the excess of the pumped water, is provided at a suitable height with a control apparatus $N_c$ of the type that has been described, connected to the motor of the pump $C'$ through lines $P_{rs}$, $P_n$. The apparatus $N_c$ is advantageously located near the top of tank R5 in position to maintain a relatively high water level in the tank. A similar control apparatus $N_b$ may be connected to the lower part of the tank and arranged to control the steam inlet valve for donkey engine B as shown in Fig. 5.

This second apparatus $N_b$ is arranged to operate in the reverse manner to those previously described, since the drop in the water level below the upper connection of the liquid coil system will produce a downward movement of the conducting liquid in the indicating tube which will raise the other end of the column of said liquid to a suitably placed contact which will start the motor $M_r$.

The motor in operation will be arranged to open gradually the donkey engine steam valve $V_r$ instead of closing it, as in the arrangements heretofore described. When the donkey engine steam valve has been sufficiently opened and the tank R has been filled to a point where the conducting liquid breaks connection with the motor circuit, the motor stops and the counterweight $P_r$ starts to close the valve. This will tend to lower the water level, unless the electric pump $C'$ has again been placed in operation.

Certain variations in the arrangements disclosed may be made without modifying the principle of the invention. For instance, when the motor is small, all of its current may pass through the regulating circuit. Another arrangement, indicated in the regulating unit $N_c$ in Fig. 6, includes the use of an electric resistance K extending downwardly from the electrode $l$ toward or to the electrode $m$, this arrangement producing variations in the resistance of the control circuit as distinguished from a make and break arrangement. These variations may be utilized in various ways to control the feed, either by varying the motor speed or by passing a variable current through a solenoid whose armature is spring-pressed away from the solenoid, suitably arranged to act directly or by intermediate mechanical transmission means upon the feed valve. The resistance system is particularly suitable for controlling an electric motor driven pump, as the circuit through the resistance may be connected with the motor circuits in known manner so that the change in current in the control circuit, due to changes in water level, will result in corresponding changes in pump motor speed. This type of arrangement is indicated diagrammatically in Fig. 6. It has already been indictaed that the control may be applied to the steam supply of a feed water pump, rather than to the water feed itself.

Figure 7 represents an arrangement in which the single control electrode is replaced by two principal control electrodes and these, in turn, are each supplemented by another electrode whose function is to suspend the operation of the regulation when the boiler water level is returning to normal.

In this arrangement the hydraulic system is similar to that illustrated in the previous figures, the U-tube $B^2$ and the lower end of tube $D^2$ being connected to the lower part of the boiler through valve $v'$ to and being filled with boiler water; the inverted U-tube formed by the upper parts of tubes $D^2$ and $E^2$ containing oil; the U-tube formed by the lower part of tube $E^2$ and tube $F^2$ contains the indicating and conducting liquid, salt water for instance; the tube $G^2$ is the indicating tube and is connected at its upper end to the lower part of tube $H^2$; the whole of tube $H^2$ and the upper part of tube $I^2$ are filled with oil; and the U-tube formed by the lower part of tube $I^2$ and tube $J^2$ contains condensed water. Tube $J^2$ is connected to the steam chamber of boiler C through valve $v$ and is provided with a condensing dome $K^2$ to assure that tube $J^2$ is maintained full of condensate. A horizontal U-tube may be substituted for dome $K^2$.

The water feed valve V is actuated by motor $M_e$ through the worm and worm gear $Si$.

We will first assume that only the principal electrodes $a$ and $b$ in the indicating tube $G^2$ are employed, and that the secondary electrodes $c$ and $d$, together with their circuits are eliminated.

Each of the primary electrodes $a$ and $b$ is connected to a series of solenoid switches, the connection of the last solenoid of each series to the other side of the power line being omitted to clarify the drawings. The solenoid switches receiving their current from electrode $a$ are indicated at $1$, $1'$, $1''$ and $1'''$. The solenoids receiving their current from electrode $b$ are indicated at $2$, $2'$, $2''$ and $2'''$. The lower electrode $m$ is not shown. The motor $M_e$ is of the A. C. reversible type having a main current connected to lines $P_7$ and $Q_7$, and a reversing circuit connected to lines $R_2$ and $S_2$.

One side of the power line $Q_2$ is permanently connected through line $Q_7$ to the motor, the connection of the motor return conductor $P_7$ to the other power line $P_2$ being controlled by the main solenoid switches $1$ and $2$. The armatures of these switches are arranged so that when solenoid $1$ is deenergized, the armature will close the circuit between $P_7$ and $P_2$, while the armature of solenoid $2$ is arranged so that when the solenoid is deenergized the armature will be separated from the switch contacts and the connection between $P_7$ and $P_2$ will be broken.

The solenoid switches $1'$, $1''$, $2'$, $2''$ control the connections of the reversing conductors $R_2$, $S_2$ to the power lines. Their armatures are arranged so that when solenoids $1'$ and $1''$ are deenergized, the switches will be closed, connecting the conductors $R_2$ and $S_2$ to the power lines in a direction appropriate to drive the motor $M_e$ in the proper direction to open valve V. The armatures of solenoid switches $2'$ and $2''$ are arranged so that when the solenoids are energized the switches will be closed, connecting lines $R_2$ and $S_2$ to the power lines in the reverse direction so that the motor will be driven appropriately to close the valve V.

With this arrangement, and starting with the water level at the maximum height, electrodes $a$ and $b$ will both be in contact with the conducting liquid and their circuits will be energized. The energizing of the circuit of electrode $a$ will open the solenoid switches $1$, $1'$, $1''$. Energizing the circuit through electrode $b$ will close the solenoid switches $2$, $2'$, $2''$ connecting the motor to the main line through conductors $P_7$, $P_2$ and the reversing circuit conductors $R_2$, $S_2$ to the power lines in the proper direction to close the valve. When the conducting liquid level falls below electrode $b$, the latter circuit will be opened, disconnecting the motor circuits, and the valve remains stationary until the level falls below electrode $a$, when the deenergizing of the solenoid switches $1$, $1'$, $1''$ will close the switches, connecting the motor appropriately to open the valve. After the water level has reached its lowest point and starts to rise, the procedure will be reversed.

The secondary electrodes $c$ and $d$ operate to suspend the regulating action when the boiler water level is returning toward normal.

The circuit connected to electrode $c$ passes in series through the windings of solenoid switches $3$ and $3'$; and an auxiliary solenoid switch $1'''$ connected to electrode $a$ is associated with this circuit. The circuit from electrode $d$ passes in series through the windings of solenoid switches $4$ and $4'$; and an auxiliary solenoid switch $2'''$ connected to electrode $b$ is associated with the latter circuit.

These auxiliary circuits contain stick circuits arranged so that when the conducting liquid rises for instance past electrode $b$, although the circuit connected to electrode $c$ is open the motor is not arrested; but after the $c$ circuit is closed by rise of the liquid and the conducting liquid thereafter descends past $c$, the stick circuit is arranged so that the opening of the circuit through electrode $c$ stops the motor. A similar arrangement is provided in the circuit from electrode $d$.

In the specific arrangement illustrated, the conductor from electrode $b$ to solenoid switch $2$ includes a branch opened and closed by the armature of solenoid switch $3'$, and a parallel branch opened and closed by the solenoid switch $3$, the armature of these two switches being arranged so that when the circuit through electrode $c$ is energized, solenoid $3$ closes the upper branch and solenoid $3'$ opens the lower branch. The armature of switch $3'$ is however connected by an arm $m_1$ to armature $n_1$ of solenoid switch $1'''$ which however is normally located at a distance from the winding too great to affect the armature when the winding is energized. Consequently the rise of the liquid above electrode $a$, which will energize switch $1'''$, will not move the armature $n_1$ of said switch.

When the liquid rises into contact with electrode $c$, switch $3'$ will lift its armature and lever $m_1$, bringing armature $n_1$ into effective holding relationship to switch $1'''$. This movement will open the lower branch of the circuit from electrode $b$ to switch $2$; but as switch $3$ will simultaneously close the upper branch the circuit will remain closed and the motor will continue to close the valve V. When the conducting liquid descends past electrode $c$ and switches $3$ and $3'$ are deenergized, the upper branch of the electrode $3$ circuit will be opened, but the lower branch will not close, as it is held open by solenoid switch $1'''$.

The circuits which arrest the opening of the valve when a liquid reaches electrode $d$ are similar in principle but slightly different mechanically. Electrode $d$ is connected to electrode $a$ by a conductor that passes through switches $4$ and $4'$, which are arranged so that when switch $4'$ is energized it opens, and when switch $4$ is deenergized it closes. The armature of switch $4'$ is pivotally connected to a rocking lever $p$ arranged so that when it drops to a lower position as switch $4'$ is deenergized it is engaged by a hook $q'$ that holds lever $p$ in position until the hook is released by the energizing of solenoid switch $2'''$ connected to electrode $b$, the armature of said switch being connected to hook $q'$. With this arrangement, as the conducting liquid falls below electrode $b$, switch $2'''$ is deenergized, releasing its armature, and hook $q'$ is in engaging position. When the liquid drops below electrode $d$ while the motor is operating to open the valve V, deenergizing of switch $4'$ engages lever $p$ with hook $q'$ and closes said switch while the deenergizing of switch $4$ opens the circuit from $d$ to $a$, and the motor operation continues. When the liquid again rises into contact with electrode $d$, the energizing of switch $4$ closes the switch; and as switch $4'$ is held in closed position by the engagement of lever $p$ with hook $q'$, the circuit to $a$ and its connected switches is closed, the switches are energized and opened and the motor stops. When the rising liquid makes contact with electrode $b$ and starts the motor in the reverse direction, the energizing of switch $2'''$ trips hook $q'$, releasing lever $p$ and restoring the original condition.

If we call M the maximum high point of the water in one of its oscillating movements, inasmuch as the regulation continues to operate as long as the level descends from the maximum point M down to the electrode $c$, during that time the aperture of the valve continues to be reduced below the proper aperture, which represents a deficiency and produces an oscillation, but the extent of such oscillation is reduced from Mb to Mc.

With the purpose of rapidly eliminating such oscillations, the electrodes $c$ and $d$ are situated at respectively different ditsances from the electrodes $b$ and $a$, the electrode $c$ being situated sufficiently high to reduce an important oscillation almost totally at one time, while the electrode $d$ is situated near enough to the electrode $a$ so that it may operate upon any oscillation of sufficient extent to cause a disturbance in the operation of the boiler. If those two supplementary electrodes are supplemented by other electrodes operating in the same way and at different distances from the principal electrodes, perfection in the regulating operation will very rapidly be obtained.

The arrangement described may be modified in various ways. For instance, while solenoid $2'''$ has been shown in vertical position, it might be arranged in line with lever $p$ and the attraction of the hook $q'$ by the solenoid would shift the hook out of engaging relationship to lever $p$. One auxiliary electrode may be omitted.

The arrangement disclosed utilizes salt water as a conducting liquid, thereby providing an excellent conductor of electricity, whereas ordinary water, and particularly distilled water, is a rather poor electrical conductor. Moreover, the oil employed in the system is an excellent insulator. The arrangement also provides a magnification of the differences in water level in the boiler. However, under certain circumstances, certain features of the invention are applicable to the usual water level sight gauge construction, in which the water would constitute the conducting liquid and the steam would serve to break the connection. The features of the invention are also applicable to other regulating conditions where similar problems exist.

The regulation described for the water feed is applied according to the invention as the basis for the regulation of the means of combustion. The proportion between the feeding rates of the means of combustion, on the one part, and the feeding rate of water, on the other, represents the efficiency coefficient of the boiler.

Experimental data demonstrates that starting with conditions in the operating system of the boiler which provide the greatest efficiency, if that system is changed until the steam production in the boiler is doubled, the efficiency of the boiler diminishes slightly, or about 2% to 3%, so that the quantity of fuel burned for each kilogram of steam produced increases slightly, possibly from 2% to 3%. But when steam production is forced in order to meet greater needs of consumption the efficiency of the boiler keeps diminishing with continued acceleration as the rate of steam production increases. If, on the contrary, the rate of steam production is diminished below that of greatest efficiency, the quantity of fuel required for the production of a kilogram of steam also continues to increase because the losses from cooling through the masonry of the boiler represent an ever greater proportion relative to the total heat utilized in the boiler.

The steam generative efficiency under these circumstances is very slightly affected as long as the boiler operates under conditions applicable in practice. If it is desired to express these conditions mathematically it may be estimated, for example, that a boiler that shows an efficiency of 85% when operating under the best conditions, or with an hourly steam production P, can reach a production of a quantity of steam 2 P per hour with a drop in efficiency to about 83% or 82%; but when a greater production is demanded the efficiency may drop down to 78% or 77% if the hourly production is 3 P, and to 75% or 74% if the hourly production reaches 3.5 P. If, on the contrary, the boiler operates under a lower hourly steam production than the quantity P, its efficiency will still diminish slightly but progressively, and with an hourly production of ½ P the efficiency can be maintained at from 81% to 82%. This data will of course vary with the nature of different boilers and the type of installation.

A feature of the invention includes a system in which experimental data obtained from the boiler itself or from similar installations is utilized initially to calculate the maximum and minimum efficiency of the boiler when operating within the limits of steam consumption which it is expected to encounter. From this the maximum and minimum fuel consumption for each liter of water evaporated in the boiler may be calculated. The regulation of the fuel feed may then be effected in two different ways, depending upon whether the maximum or the minimum fuel consumed per liter of water evaporated is taken as a basis. Let us suppose, for example, that the boiler is heated with fuel oil. If the maximum fuel consumption is taken as a basis an oil pump rate is established which will provide, for each liter of water injected into the boiler, the indicated maximum quantity of oil plus a slight margin. In this way the oil feed always provides an excess of fuel with reference to the requirements of the boiler; the greater the excess, the greater the efficiency of the boiler in operation.

The excess of oil pumped is diverted before it reaches the burners. This separation is effected simply by connecting the discharge from the pump with the pump suction by a pipe provided with a valve having an adjustable opening, so that the return of the pumped oil to the pump suction exactly adjusts the remainder of the pumped oil supply to the requirement of the boiler. The regulation of the valve is effected in turn through variations in the boiler pressure as hereafter described. The oil return pipe may be provided with two valves, one regulated by hand to limit the maximum amount of oil returned to the pump suction, the other providing within such limits the variation in the quantity returned, which will adjust said quantity at all times to the boiler requirements.

The air feed to the furnace must be regulated at the same time as the fuel in such manner as to maintain the same proportionate supply of air and fuel to the furnace in order to produce the best possible combustion of the fuel. The regulation of the air is effected by operating the fan so that it normally forces into the furnace a volume of air proportional to the total quantity of oil passing through the pump, and reducing the volume of air in the same proportion as that by which the supply of pumped oil is reduced by return of part of the same to the pump suction, by means of an air regulating valve placed in the air feed duct to the furnace and operated by variations in the boiler pressure. The air valve, therefore, must be constructed so that it will only partially limit the volume of air fed by the fan in conformity with the maximum oil return to the pump suction which may be required for regulation of the fuel supply.

When the installation does not include a fan, the air regulation may be effected by two successive valves controlling the air feed, the first one arranged to supply a volume of air proportional to the total oil discharged by the pump, and the second one arranged to reduce the stream of air from the first valve in proportion to the amount of oil taken from the pump discharge and returned to the pump suction.

If, on the contrary, the minimum fuel consumption is taken as a basis for regulation, the pump is arranged to discharge for each liter of water injected into the boiler an amount of oil which corresponds to that quantity of water less a slight amount of oil. The pump under these conditions always discharges a quantity of oil insufficient to meet the requirements of the boiler, and the deficiency of fuel is greater as the efficiency of boiler operation is lowered. The fuel deficiency is supplied by complementary pumping effected in such a way that its amount may be easily regulated, so that it supplements the quantity discharged from the main pump in order to adjust it continuously to the requirements of the boiler. This regulation is effected by means of variations in steam pressure in the boiler. The air regulation is also employed so that the air supply is proportioned to the total oil feed, by employing two fans the first of which feeds the amount of air required by the oil supply from the main pump, and the second fan supplies the air required by the oil from the regulating pump, it being possible to adjust the second fan in the same way as the pumping of the corresponding oil. If fans are not used, the air control may be obtained by means of two butterfly valves which regulate the air drawn in by the furnace, the first butterfly valve being regulated in accordance with the oil discharged from the main pump, and controlling the supply of air required by the supply of oil from the main pump, the other butterfly valve being regulated in accordance with steam pressure variations in the boiler and providing the air required by the supply of oil from the complementary regulating pump.

In both arrangements the system includes a first approximated regulation producing a feed supply proportional to the water injected and an arrangement for compensating continuously for the excess or deficiency of the oil supply, the compensation being regulated by steam pressure variations in the boiler.

When solid fuel is used, the first type of arrangement above indicated can be employed by locating a dividing blade or splitter diagonally above the fuel feed conveyor in such a way that the part of the fuel on the conveyor in the portion thereof across which the blade extends will be deflected to one side of the conveyor. Due to the motion of the conveyor, the fuel deflected in this way will fall from the conveyor and will be collected by a lower supplementary conveyor. The regulation of fuel removed in this manner from the boiler feed is effected by varying the position of the blade, which may be shifted across the conveyor in accordance with steam pressure variations in the boiler. When the second regulating system above indicated is used, the feed of solid fuel may be regulated by varying the conveyor speed in accordance with boiler pressure variations.

In connection with the practical operation of this phase of the invention, the boiler feed water which will, of course, be regulated in conformity with variations in the water level by one of the arrangements heretofore described, will pass through a rotary device the velocity of which will be proportional to the amount of water flowing through it; and the speed of the solid fuel conveyor or the pumping of the liquid fuel will be maintained proportional to the speed of the rotary device. The means for maintaining these relationships are known and will not be described in detail, but it should be mentioned that the liquid fuel pump should be of the constant volume type. If a solid fuel such as sugar cane bagasse is used, for example, the speed of the conveyor carrying the bagasse to the boiler would be maintained at a rate proportional to the speed of the rotary device. Such rotary device may be of a type commonly used as a volumetric water meter.

It is possible to introduce an additional correction in the main fuel supply which takes into account the decrease in efficiency resulting when the quantity of steam production in the boiler increases; but it is not possible to dispense totally with some correction on the basis of the steam pressure, because in practice there are other factors which are likely to modify at all times the efficiency of the boiler, such as variations in the fuel, the air itself, the irregularities in the apparatus employed, etc. All these factors are uncontrollable and prevent perfect accuracy in previously calculated regulation, making it, therefore, necessary to utilize variations in pressure to introduce the final refinement in the regulation of the fuel. Nevertheless, it is possible to arrive at a very close approximation of the correct fuel consumption by previous calculations, and in consequence to reduce very considerably the deficiency or excess of fuel to be compensated by regulation based on pressure variations.

The previously calculated corrections which may be applied to the main fuel feed in order to adjust the quantity to the actual requirements of the boiler are based on variations in the efficiency of the boiler. These variations are small as long as the fuel consumption does not increase beyond that required for producing twice the amount of steam generated when boiler operating conditions are at the point of greatest efficiency. Beyond this limit the efficiency decreases substantially and such decrease is accelerated as the fuel consumption increases. In installations expected to operate within such limits of steam generation, since the efficiency is expected to vary at most 3% or 4%, the desired regulation is sufficiently accurate and involves a final correction, controlled by variations in pressure, which is limited to approximately 5% of the total fuel feed.

However, in an exceptional case in which the boiler might sometimes operate to generate three times the amount of steam produced at the point of greatest efficiency, or even more, the increase in fuel to be supplied for each kilogram of steam produced can be raised from 12% to 15% relative to the normal consumption; that is, the correction introduced by variations in pressure must permit the total range reaching even as high as 20% of the total feed. Under these conditions a new preliminary regulation is desirable, which will change the main fuel feed and reduce the maximum correction based on variations in pressure to a notably lower limit, possibly from 5% to 6% of the total feed. The arrangement employed to effect such correction will be described later.

The arrangement for regulating the fuel feed therefore comprises:

1. A main supply or feed proportional to the quantity of water injected, producing a first approximation of the fuel requirements.

2. A preliminary correction of the main supply controlled by variations in the velocity of the feed water which reflects accurately the production of steam.

3. A final correction in the main fuel feed based on variations in steam pressure.

Referring to Figure 8, T33 is the rotary device driven by the boiler feed water passing through piping A1 to the boiler C, the device T33 being in this instance of the rotary water motor type also used sometimes as a meter. The shaft of water motor T33 is directly connected to the shaft of generator Ad which is driven by the water motor and maintained at a synchronous speed therewith proportional to the rate of water flow to the boiler. Synchronous motor M13 is driven by generator Ad in synchronism therewith and operates pump B3 which pumps the oil through pipe F3 to burner Q3. The pump feed pipe P33 is connected to the discharge pipe F3 through valve V33, and is opened and closed through a suitable worm H3 and worm gear E33 by motor M23 which is controlled in accordance with variations in steam pressure in the boiler.

The arrangement of such control as shown in Figure 8 includes a compressed air manometer comprising a tube J3 connected to the steam compartment of the boiler C through valve v3 and filled with water; a connecting inverted U-tube having a rising leg K3 and a descending leg M33 containing oil in its upper part, the lower part of leg K3 being filled with water and the lower part of leg M33 with the indicating and conducting liquid, which extends upwardly in indicating tube L3 of reduced diameter connected at its upper end to a compressed air receiver O. The lower part of tube L3 is normally filled with indicating liquid and the upper part with compressed air, the boiler pressure being measured by the height of the indicating liquid in the observation tube L3. Due to the small diameter of tube L3 relative to the air receiver O, the rise and fall of the indicating liquid will not rapidly change the air pressure to which the liquid is subjected. Likewise, the variations in height do not introduce a sufficiently great variation in liquid pressure to affect materially the sensitiveness of this type of steam pressure indicator.

The electrical system for controlling motor M23 in accordance with variations in the level of the indicating liquid in tube L3 is operated through electrodes a3 and b3 extending into the path of the indicating liquid at points slightly above and slightly below the level of the indicating liquid when the boiler pressure is normal. This distance may of course vary in accordance with the desired sensitiveness of the arrangement.

In the electrical circuits shown in Figure 8 the motor is controlled through relays, the upper relay R13 being operated from upper electrode a3 to energize the motor M23 in one direction, and the lower relay R23 being similarly actuated from electrode b3 to turn the motor in the reverse direction. Relay R13 includes a primary winding p1 connected across the main line conductors B23 and C23, and a secondary winding p2, so that connection of the ends of the secondary will produce a current flow in the usual manner. When winding p2 is thus energized it will attract an armature normally connecting contacts 23 and 43, breaking the connection and shifting the armature into connecting contact with terminals 13 and 33, thereby connecting the power line L13 with the conductor A33. When the circuit of winding p2 is broken, suitable springs will return the armature to its original position, breaking the connection between contacts 13 and 33 and reestablishing the connection between contacts 23 and 43. Line L13 is thereby disconnected from A33, but the other power line L23 is connected to conductor B33.

The relay R23 operates in the reverse manner. It includes a primary winding p3 connected across power lines B23 and C23, and a secondary winding p4 which, when energized by completing the circuit through the electrode G3 operates to attract an armature normally connecting contacts 31' and 33', breaking such contacts and connecting contacts 32' and 34'. When the relay R23 is deenergized the power line L13 will therefore be connected to conductor A13; and when it is energized power line L23 will be connected to conductor B13. Electrode a3 is connected to one end of secondary winding p2, the other end of which is connected to electrode e3 at the bottom of tube M33 and in constant electrical contact with the conducting liquid. Electrode b3 is connected to one end of secondary winding p4, the other end of which is likewise connected to electrode e3.

With this arrangement, when the conducting liquid is below electrode b3 the current enters motor M23 through L13, 31', 33', A13 and passes out through B33, 43, 23, L23, arranged so that the motor is driven in a direction appropriate to close valve V33. When the conducting liquid level is between electrodes a3 and b3 the conductors A33 and A13 are disconnected from power line L13 and therefore the motor is stopped. Finally, when the conducting liquid rises into contact with electrode a3 the motor connections are reestablished and the current enters the motor through L13, 13, 33, A33, and goes out through B13, 32', 34', L23, driving the motor in the opposite direction and therefore appropriately to open the valve V33. This result is due to the fact that lines B33 and A13 are connected to the same side of the motor circuits and A33 and B13 to the other side. Various electric connections and various known motor reversing systems may of course be employed with the indicated relay and electrode systems.

The drawings also show in diagrammatic form an arrangement whereby, when the spindle of valve V33 reaches either limit of its motion, the electric circuit which drove the valve to said limit will be broken and the motor M23 cannot be driven in the same direction until it has rotated in the opposite direction to move the valve stem away from its limiting position. In the illustrated arrangement this is accomplished by disconnecting lines B33 and A13 from the motor by a double pole switch of well known type actuated by inward and outward movements of the valve spindle.

As indicated above, as long as the boiler pressure is below normal the conducting liquid will not reach electrode b3, and motor M23 will rotate in a direction which will progressively close valve V33 thereby increasing constantly the fuel feed. When the level of the conducting liquid is located between $a3$ and $b3$, that is, when the pressure does not require regulating, the motor is stopped and valve V33 maintains a fixed opening. When the pressure rises too high, the conducting liquid rises above electrode $a3$, motor M23 slowly opens valve V33 so as to diminish progressively the fuel feed, the decrease continuing as long as the steam pressure does not fall to the point measured by electrode $a3$.

An alarm electrode $c3$ is located in the path of the conducting liquid at a level marking the limit of permissible steam pressure for the boiler. When the liquid reaches that height, relay R33 is energized, closing the circuit of a suitable alarm such as lamp L33. Low pressure electrode $d3$ is located in the path of the conducting liquid at a level corresponding to the minimum permissible steam pressure for the boiler. When said liquid breaks contact with electrode $d3$ the relay R43 connected to the electrode is deenergized, closing the circuit of an underpressure alarm such as bell T$m$.

When the system is applied to solid fuel, the motor M23 is arranged to produce forward or backward movements of the blade, located diagonally across the conveyor, which removes from the conveyor the excess of coal from the main fuel feed.

If the arrangement is applied to the second system in which the main pump supplies minimum fuel, the complementary liquid fuel from the secondary pump can be provided in excess by means of a pump having a variable volumetric discharge, such as a centrifugal pump, and the discharge valve of the pump can be regulated by means of the same type as that disclosed for regulating valve V33, but operating of course in a reverse direction. For simplicity the showing of such complementary pump and control system is omitted, as its construction and arrangement will be entirely clear.

In another arrangement of this type the motor M23, which regulates the passage of liquid through the valve V33, can be employed to regulate rheostats which govern the complementary feed supply. Many arrangements which are suitable are known and can be employed.

It is desirable to place a valve complementary to valve V33 in the same pipe connecting discharge pipe F3 with feed pipe P33. The additional valve is regulated by hand and limits the extent of regulation based on variations in steam pressure. Once the hand valve has been properly set, it must not be changed as long as the quality of the fuel oil does not change.

It is also convenient to register graphically the oscillations of the regulating valve V33. The graph of these oscillations relative to oscillations of the feed water supply records the variations in the boiler efficiency, and affords a basis for the study of deficiencies which may have altered the original efficiency. It, therefore, makes it possible to seek a remedy for such deficiencies as far as possible and indicates the desirable regulation of the hand valve.

The electric systems shown in Figure 8 are capable of modification and have been presented for illustrative purposes.

Figure 9 shows an arrangement for regulating both the fuel and the air supply of a boiler furnace employing fuel oil and arranged in accordance with the system in which the main pump supply is in excess of the needs of the furnace, and the steam generation in the boiler is expected to vary within very wide limits. Three operations are carried out, both in the oil feed and the air supply, in order to obtain the proper over-all regulation of these constituents. These operations are:

1. The production of a main fuel feed supply proportionate at all times to the feed water supply and calculated to meet the boiler requirements even when working under its least efficient conditions of operation.

2. The subtraction of part of the excess of fuel from the main feed, the regulation of which compensates for differences produced by excessive increases in steam generation in the boiler efficiency.

3. The subtraction of a second part of such excess in order to regulate the fuel supply accurately in accordance with the real requirements of the boiler, this last subtraction being effected in accordance with steam pressure variations in the boiler.

In this figure A39 indicates the water motor and B39 is the main fuel oil pump, which is controlled to pump an amount corresponding at all times with the rate of feed water supply to the boiler in the manner indicated in Figure 8. The first subtraction of oil from the discharge from pump B39 is effected through valve V$a$ located in a line connecting the pump feed pipe P33 with the pump discharge pipe F3. For regulating valve V$a$, there is shown a ball governor R$a$ driven by water motor A39 through gearing F33 and connected by suitable linkage and gearing with the stem of valve V$a$. In the form shown, the linkage includes a link $m3$ connected to crank $n3$ on pinion E' meshing with pinion E on shaft N33, carrying pinion $g3$ meshing with pinion $h3$ on the stem of valve V$a$. The ball governor is designed so that it commences to rise only when the rate of water feed is about double the feed required by the boiler when operating under the most efficient conditions. In consequence, when the water feed increases beyond that point, the governor R$a$ moves vertically, and the farther it moves the more the rate of fuel feed is increased. This type of governor, however, is not suited for the required regulation without modification because its amplitude of movement decreases as its speed increases, whereas the regulation must on the contrary be greater as the speed reflecting the rate of feed water supply increases. In order to compensate for these conditions, the pinions $g3$ and $n3$ are of the elliptic type and are angularly positioned to compensate for the action of the ball governor R$a$.

Furthermore, valve V$a$ is provided with a plug having a tapering longitudinal section whose contour is designed so that the valve opening will vary at the proper rate. By suitably designing the plug it will serve to compensate for the variations in boiler efficiency at rates of steam generation substantially different from that at which the boiler is most efficient. A hand valve V'$r$ is also inserted in the line in which valve V$a$ is located, so that the latter valve will operate only within a small range of flow.

The third operation enumerated above, consisting of the subtraction of an additional fraction of the fuel feed in conformity with variations in steam pressure in the boiler, is obtained by valve V$p$ located in another line connecting the fuel pump suction pipe P33 with the pump discharge pipe F3. The control for valve Vp is the same as that shown and described in connection with Figure 8 and therefore is not reproduced.

It should be noted that when the boiler is fed with solid fuel the ball governor Ra may be connected to govern the position of the fuel separating blade through mechanism including the arrangements for adapting the rate of adjustment to that desired for this purpose, as already described.

When the other system of feed regulation is employed, in which the main fuel feed corresponds to the minimum requirement and is adjusted by additional feed, the complementary feeding apparatus may be driven electrically and its speed regulated through the ball governor. A rheostat which may be thus governed must be constructed so that its adjustments produce a suitable change in current corresponding to the required change in the feeding rate of the supplemental feeder.

The air feed regulation may be obtained in the same manner as the regulation of the fuel oil feed when fans are employed. In Figure 9 it has been assumed that the air feed will be obtained through the stack draft of the furnace, the air regulation being then effected by valves controlling the admission of air to the furnace by registers which change the effective cross-section of the stack, or by both means.

In Figure 9 the main regulation of the air supply, corresponding to the main fuel feed control, is effected by butterfly valve M39. A ball governor Rp mounted on the shaft of fuel pump B39 effects the required regulation. In order to compensate for the decrease in amplitude of the governor movements as its speed increases, it is connected to valve M39 through gears J33 and K33. These gears are of the elliptical type, but are designed so that J33 has twice as many teeth as K33, producing the required amplitude of movement of valve M39.

The variations in the air flow, corresponding to the variation in fuel supply through valve Va are obtained through the primary flat register R39. Figure 10 is an elevation of the register from the outside of the furnace and illustrates the contour of the movable shutter R39', so that by rotation of the shutter the areas of the openings S3 through the register is increased at a progressive rate, this arrangement producing the same effect as the special shape given to the plug of the valve Va.

The shutter R39' is operated by the drive mechanisms controlling valve Va, shaft N33 and pinion f33 meshing with ring gear e33 on the shutter R39'.

The variations in the air stream corresponding to the changes in the by-pass fuel oil effected by valve Vp may often be omitted in practice because such variations will be limited to a maximum of 5%; but where it is employed it may be effected as shown in the form illustrated by a register U3, frusto-conical in shape whose shutter W is operated through ring gear d33 and pinion c33 and connected to shaft N13 carrying pinion b33 meshing with pinion a33 on the stem of valve Vp. The shutter W is suitably designed so that its rotation will diminish the air of the air passages through register U3 in about the same proportion as the corresponding changes in valve Vp reduce the supply of fuel oil.

Figure 11 illustrates diagrammatically a unitary system which combines all of the features disclosed in Figures 7, 8 and 9 in a cooperative relation. It is not necessary at this point to describe the details of this apparatus for the several portions have been fully described in connection with the discussions of Figures 7, 8 and 9. The manner in which these figures are combined to cooperate in the unitary system shown in Figure 11 will be apparent from a mere inspection of this figure. Thus a comparison of Figure 11 with Figure 8 will show that it includes the apparatus shown in Figure 8 and that the apparatus shown in Figure 7 are combined therewith by providing a tubular connection from the boiler side of the valve v in Figure 7 to the boiler side of the valve v3 in Figure 8. Similarly, the connection between the valve v' and the boiler is shown in Figure 11 by a long tube. The apparatus shown in Figure 7 is also shown in Figure 11 as combined with the remaining apparatus shown therein by connecting the boiler side of the valve V to the inlet side of the water motor A39, the outlet side of this water motor being connected to the bottom of the boiler.

While preferred arrangements and mechanisms for the various parts of the illustrated apparatus have been described, these features in many instances may be substantially modified or replaced by other instrumentalities having similar functions and methods of operation without departing from the invention.

I have described what I believe to be the best embodiments of my invention. I do not wish, however, to be confined to the embodiments shown, but what I desire to cover by Letters Patent is set forth in the appended claims.

I claim:

1. A boiler control system comprising means for adjusting the rate of water feed to the boiler, and means for controlling the adjusting means to correct variations from the normal boiler water level comprising a column of conducting liquid; means for varying the level of said liquid in conformity with variations in the boiler water level including a hydraulic connection between the upper end of the column and the steam chamber in the boiler and a hydraulic connection between the lower end of the column and the water in the lower part in the boiler, including a balancing column connected to the lower end of the conducting column and extending above the level of the conducting liquid in the latter column and electrical control means connected to the adjusting means, associated with the conducting liquid column, and actuated by variations in the column level.

2. A boiler water level control system as set forth in claim 1, in which the level of the column of conducting liquid is varied by connecting the upper end of the column with the steam chamber in the boiler through a body of electrically insulating liquid, and connecting the lower end of the column with the water in the lower part of the boiler through a body of electrically insulating liquid.

3. A boiler water level control system as set forth in claim 1, in which the level of the conducting liquid is varied by connecting the upper end of the column with the steam chamber in the boiler through an inverted U tube containing oil and connected to a U tube containing water which is connected in turn with the boiler, and the lower end of the column is connected to the water in the lower part of the boiler by arranging the lower end of the column in a U tube connected to an inverted U tube containing oil and connected in turn to a U tube containing water which is connected to the lower part of the boiler.

4. A boiler water level control system as set forth in claim 1, including a unitary casing provided with passages forming a series of U tubes formed by connecting the ends of vertical bores extending lengthwise of the casing and consisting of an upper system and a lower system connected on their outer ends to form a vertical tube section, the column of conducting liquid extending upwardly into the said tube section, the upper tube system being filled with liquid and connected to the boiler steam chamber, the lower tube system being filled with liquid and connected to the water in the lower part of the boiler.

5. A boiler water level control system as set forth in claim 1, in which the level of the column of conducting liquid is varied by connecting the upper end of the column hydraulically with the steam chamber in the boiler through a system of U tubes filled with a lighter liquid in their upper portions and a heavier liquid in their lower portions, and by connecting the lower end of the column hydraulically with the water in the lower part of the boiler through a system of U tubes having their upper portions filled with a lighter liquid and their lower portions filled with a heavier liquid, the outer ends of the systems being connected by a section in which the upper part of the column is normally located, said section being of substantially lesser diameter than tubes forming the remainder of the said systems.

6. A boiler control system as set forth in claim 1 in which the adjusting means includes a valve and a motor arranged to operate the valve, the control means including a column of conducting liquid variably energized in conformity with said variations in the water level, and controlling the operation of the motor.

7. A boiler water level control system as set forth in claim 1, in which the adjusting means includes a valve and a motor arranged to operate the valve, the control means including a column of conducting liquid variably energized in conformity with said variations in the water level, and controlling the operation of the motor, and, in which the valve regulates the operation of a feed water pump.

8. A boiler control system comprising means for adjusting the rate of water feed to the boiler, and means for controlling the adjusting means to correct variations from the normal boiler water level, comprising a column of conducting liquid, means for varying the level of said liquid in conformity with variations in the boiler water level, and electrical control means connected to the adjusting means including contact means arranged for contact with the conducting liquid and variably energized by variations in the liquid column level, the electrical control means comprising one or more circuits connecting the conducting liquid with a plurality of electrodes positioned for contact with the conducting liquid, including an upper electrode above the normal liquid level connected with means for decreasing the water feed when energized by contact of the upper electrode with the liquid, and a lower electrode connected with means for increasing the water feed when deenergized by breaking contact of the lower electrode with the liquid.

9. A boiler control system comprising means for adjusting the rate of water feed to the boiler, and means for controlling the adjusting means to correct variations from the normal boiler water level, comprising a column of conducting liquid, means for varying the level of said liquid in conformity with variations in the boiler water level, and electrical control means connected to the adjusting means comprising circuits connecting the conducting liquid with an upper primary electrode positioned for contact with the conducting liquid above the normal liquid level and connected to means for reducing the water feed when energized by contact of the upper primary electrode with the liquid, an upper auxiliary electrode located above the upper primary electrode and connected with means for arresting the flow-decreasing means when the liquid descends out of contact with the upper auxiliary electrode, said arresting means being ineffective during the rise of the liquid from the upper primary electrode, a lower primary electrode located below the normal liquid level and connected to means for increasing the water flow when deenergized by descent of the liquid beyond the lower primary electrode, and a lower auxiliary electrode located below the lower primary electrode and connected with means for arresting the water flow increasing means when energized by the rise of the liquid into contact with the lower auxiliary electrode, said latter means being ineffective during the descent of the liquid from the lower primary electrode.

10. A boiler water level control system as set forth in claim 9 in which each arresting means is rendered ineffective by means including magnetically operated switches and a stick circuit.

11. A boiler control system comprising means for adjusting the rate of water feed to the boiler, and means for controlling the adjusting means to correct variations from the normal boiler water level, comprising a column of conducting liquid, means for varying the level of said liquid in conformity with variations in the boiler water level, and electrical control means connected to the adjusting means comprising circuits between the conducting liquid column and each of two spaced electrodes located in the path of the column at either side of the normal column level, means including a reversible motor for varying the rate of feed water supply in accordance with the direction of rotation of the motor, magnetic switch means in circuit with the lower electrode and arranged to close the main motor circuit when deenergized, magnetic switch means in circuit with the lower electrode and operative when the circuit is deenergized to connect the motor reversing circuit to power lines in a direction appropriate to increase the water supply, magnetic switch means in circuit with the upper electrode arranged to close the main motor circuit when the switch circuit is energized and magnetic switch means in circuit with the upper electrode arranged to connect the motor reversing circuit to power lines when the circuit is closed in a direction appropriate to decrease the rate of water supply.

12. A boiler control system comprising means for adjusting the rate of water feed to the boiler, and means for controlling the adjusting means to correct variations from the normal boiler water level, comprising a U-tube, a column of conducting liquid in the tube, means for varying the level of said liquid in the tube in conformity with variations in the boiler water level, and electrical control means connected to the adjusting means including contact means having a permanent contact with the column and variable contact elements at each end of the column in the tube, each arranged to make contact with the liquid when the adjacent end of the column rises to a predetermined level.

13. A boiler control system comprising in combination means for varying the rate of feed water supply, and means for automatically regulating the heat supplied to the boiler including a liquid fuel pump, means for controlling the discharge rate of the pump in conformity with variations with the rate of feed water supply, means for returning from the pump discharge to the pump feed an amount of fuel corresponding to variations in the boiler steam pressure, and means for returning from the pump discharge to the pump feed an amount of fuel corresponding to increases in the rate of water feed supply above the preferred rate for most efficient steam generation and calibrated to compensate for decreases in said efficiency.

14. A boiler control system comprising in combination, means for automatically correcting variations in boiler water level from a predetermined level by regulating the rate of feed water supply, means for automatically varying the rate of the fuel supply in accordance with variations in the rate of feed water supply, means for automatically controlling at least a portion of the fuel supply in accordance with variations in the rate of feed water supply from the rate appropriate for most efficient steam generation, and means for automatically regulating at least a portion of the fuel supply in accordance with variations in the boiler steam pressure.

15. A boiler control system comprising in combination, means for automatically correcting variations in the boiler water level from a predetermined level by adjusting the rate of feed water supply, means for automatically regulating the heat supplied to the boiler by varying the fuel supply and the air supply in accordance with variations in the feed water supply, and means for automatically adjusting the fuel supply and the air supply in conformity with variations in the boiler steam pressure, the means for correcting the boiler water level operating only when such water level moves away from a predetermined level.

16. A boiler control system as set forth in claim 15, in which the rate of at least a portion of the fuel supply is adjusted in accordance with variations in the boiler steam pressure, the rate of a primary air supply is adjusted in accordance with variations in the main fuel supply, and the rate of a supplemental air supply is adjusted in accordance with variations in the rate of said portion of the fuel supply.

17. A boiler control system as set forth in claim 15, in which the fuel supply is adjusted by means responsive to variations in the boiler steam pressure, said means including a valve, and the air supply is regulated in accordance with variations in the boiler steam pressure by means including a valve operatively connected to the fuel valve for proportional operation.

18. A boiler control system as set forth in claim 15 including a liquid fuel pump and a blower, means for regulating the pump speed and the blower speed in conformity with variations in the boiler feed water supply, means for varying the rate of fuel supply and air supply for fuel combustion in accordance with variations in the fuel feed pump speed, and means for adjusting the fuel supply and the air supply in conformity with variations in the boiler steam pressure.

19. A boiler water level control system comprising a plurality of boilers having a common water supply; separate means for adjusting the rate of water feed to each boiler from said supply, and means for controlling the adjusting means for each boiler to correct variations from the normal boiler water level comprising a column of conducting liquid, means for varying the level of said liquid in conformity with variations in the boiler water level, and electrical control means connected to the adjusting means including contact means arranged for contact with the conducting liquid and variably energized by variations in the liquid column level, a pump system for providing said supply, an overflow tank receiving the surplus water from the pump system, and means for regulating the rate of water discharge from the pump system in conformity with variations in the level of the water in the overflow tank.

20. A boiler water level control system as set forth in claim 19 in which two separate pump systems are provided, the control means comprising two units, one unit being connected to one pump system and arranged to maintain a water level in the upper part of the overflow tank, the second unit being connected to the other pump system and arranged to maintain a water level in the lower part of the tank when the first unit and pump system are ineffective to maintain said level in the upper part of the tank.

21. A boiler control system comprising in combination, means for automatically correcting variations in the boiler water level from a predetermined level by varying the rate of boiler feed water supply, means for maintaining substantially uniform steam back pressure on the feed water supply by automatically correcting variations in the boiler steam pressure, including means actuated by variations in the rate of water supply for automatically regulating the rate of fuel supply, said system also including a fuel oil feed pump, a return line connecting the pump discharge to the pump feed, a valve controlling the flow through the return line, and means for automatically operating the valve to vary the valve opening in conformity with variations in the boiler steam pressure.

22. A boiler control system comprising in combination, means for automatically correcting variations in the boiler water level from a predetermined level by varying the rate of boiler feed water supply, means for maintaining substantially uniform steam back pressure on the feed water supply by automatically correcting variations in the boiler steam pressure, including means actuated by variations in the rate of water supply for automatically regulating the rate of fuel supply, said system also including a fuel pump, a water motor driven by a feed water supply, a generator driven by the water motor, and a synchronized electric motor driven by the generator and operating the fuel feed pump.

23. A boiler control system comprising in combination, means for automatically correcting variations in the boiler water level from a predetermined level by varying the rate of boiler feed water supply, means for maintaining substantially uniform steam back pressure on the feed water supply by automatically correcting variations in the boiler steam pressure, including means actuated by variations in the rate of water supply for automatically regulating the rate of fuel supply, and electrical means for controlling the operation of the feed fuel supply regulating means, said electrical means including a manometer operated by the boiler steam pressure and provided with a column of conducting liquid varying in level in conformity with variations in said steam pressure, and electrical control means operatively connected to said fuel supply regulating means, including contact means variably energized by variations in the liquid column level.

24. A boiler control system comprising in combination, means for automatically correcting variations in the boiler water level from a predetermined level by varying the rate of boiler feed water supply, means for maintaining substantially uniform steam back pressure on the feed water supply by automatically correcting variations in the boiler steam pressure, including means actuated by variations in the rate of water supply for automatically regulating the rate of fuel supply, and means for automatic supplemental regulation of the rate of fuel supply in conformity with variations in the boiler steam pressure.

JEAN LOUMIET ET LAVIGNE.